(12) United States Patent
Litvak et al.

(10) Patent No.: US 8,787,663 B2
(45) Date of Patent: Jul. 22, 2014

(54) TRACKING BODY PARTS BY COMBINED COLOR IMAGE AND DEPTH PROCESSING

(75) Inventors: Shai Litvak, Beit Shemesh (IL); Tomer Yanir, Rinatya (IL); Eran Guendelman, Tel Aviv (IL)

(73) Assignee: Primesense Ltd., Tel Aviv (IL)

( * ) Notice: Subject to any disclaimer, the term of this patent is extended or adjusted under 35 U.S.C. 154(b) by 751 days.

(21) Appl. No.: 13/036,022

(22) Filed: Feb. 28, 2011

(65) Prior Publication Data

US 2011/0211754 A1    Sep. 1, 2011

Related U.S. Application Data

(60) Provisional application No. 61/308,996, filed on Mar. 1, 2010.

(51) Int. Cl.
    *G06K 9/00*      (2006.01)

(52) U.S. Cl.
     USPC ........................................................ 382/165

(58) Field of Classification Search
     None
     See application file for complete search history.

(56) References Cited

U.S. PATENT DOCUMENTS

| | | | |
|---|---|---|---|
| 4,550,250 A | 10/1985 | Mueller et al. | |
| 4,988,981 A | 1/1991 | Zimmerman et al. | |
| 5,594,469 A | 1/1997 | Freeman et al. | |
| 5,684,887 A | 11/1997 | Lee et al. | |
| 5,846,134 A | 12/1998 | Latypov | |
| 5,852,672 A | 12/1998 | Lu | |
| 5,862,256 A | 1/1999 | Zetts et al. | |
| 5,864,635 A | 1/1999 | Zetts et al. | |
| 5,870,196 A | 2/1999 | Lulli et al. | |
| 6,002,808 A | 12/1999 | Freeman | |
| 6,176,782 B1 | 1/2001 | Lyons et al. | |
| 6,256,033 B1 | 7/2001 | Nguyen | |
| 6,262,740 B1 | 7/2001 | Lauer et al. | |
| 6,345,893 B2 | 2/2002 | Fateh et al. | |
| 6,452,584 B1 | 9/2002 | Walker et al. | |
| 6,658,136 B1 | 12/2003 | Brumitt | |
| 6,681,031 B2 | 1/2004 | Cohen et al. | |

(Continued)

FOREIGN PATENT DOCUMENTS

| | | |
|---|---|---|
| JP | H03-029806 A | 2/1991 |
| JP | H10-235584 A | 9/1998 |

(Continued)

OTHER PUBLICATIONS

Bleiwess et al., "Fusing Time-of-Flight Depth and Color for Real-Time Segmentation and Tracking", Dyn3D 2009, Lecture Notes in Computer Science 5742, pp. 58-69, Jena, Germany, Sep. 9, 2009.

(Continued)

*Primary Examiner* — Sean Motsinger
(74) *Attorney, Agent, or Firm* — D. Kligler I.P. Services Ltd.

(57) ABSTRACT

A method for image processing includes receiving a depth image of a scene containing a human subject and receiving a color image of the scene containing the human subject. A part of a body of the subject is identified in at least one of the images. A quality of both the depth image and the color image is evaluated, and responsively to the quality, one of the images is selected to be dominant in processing of the part of the body in the images. The identified part is localized in the dominant one of the images, while using supporting data from the other one of the images.

58 Claims, 4 Drawing Sheets

(56) References Cited

U.S. PATENT DOCUMENTS

| | | |
|---|---|---|
| 6,686,921 B1 | 2/2004 | Rushmeier |
| 6,741,251 B2 | 5/2004 | Malzbender |
| 6,771,818 B1 | 8/2004 | Krumm et al. |
| 6,857,746 B2 | 2/2005 | Dyner |
| 6,977,654 B2 | 12/2005 | Malik et al. |
| 7,003,134 B1 | 2/2006 | Covell et al. |
| 7,003,136 B1 | 2/2006 | Harville |
| 7,013,046 B2 | 3/2006 | Kawamura et al. |
| 7,042,440 B2 | 5/2006 | Pryor et al. |
| 7,042,442 B1 | 5/2006 | Kanevsky et al. |
| 7,170,492 B2 | 1/2007 | Bell |
| 7,215,815 B2 | 5/2007 | Honda |
| 7,259,747 B2 | 8/2007 | Bell |
| 7,264,554 B2 | 9/2007 | Bentley |
| 7,289,227 B2 | 10/2007 | Smetak et al. |
| 7,302,099 B2 | 11/2007 | Zhang et al. |
| 7,317,830 B1 | 1/2008 | Gordon et al. |
| 7,333,113 B2 | 2/2008 | Gordon |
| 7,340,077 B2 | 3/2008 | Gokturk et al. |
| 7,348,963 B2 | 3/2008 | Bell |
| 7,358,972 B2 | 4/2008 | Gordon et al. |
| 7,370,883 B2 | 5/2008 | Basir et al. |
| 7,428,542 B1 | 9/2008 | Fink et al. |
| 7,474,256 B2 | 1/2009 | Ohta et al. |
| 7,536,032 B2 | 5/2009 | Bell |
| 7,555,158 B2 | 6/2009 | Park et al. |
| 7,573,480 B2 | 8/2009 | Gordon |
| 7,576,727 B2 | 8/2009 | Bell |
| 7,580,572 B2 | 8/2009 | Bang et al. |
| 7,583,275 B2 | 9/2009 | Neumann et al. |
| 7,688,998 B2 | 3/2010 | Tuma et al. |
| 7,696,876 B2 | 4/2010 | Dimmer et al. |
| 7,812,842 B2 | 10/2010 | Gordon |
| 7,821,541 B2 | 10/2010 | Delean |
| 7,840,031 B2 | 11/2010 | Albertson et al. |
| 7,925,077 B2 | 4/2011 | Woodfill et al. |
| 7,925,549 B2 | 4/2011 | Looney et al. |
| 8,175,374 B2 | 5/2012 | Pinault et al. |
| 8,280,106 B2 | 10/2012 | Ma |
| 8,320,621 B2 | 11/2012 | McEldowney |
| 8,358,342 B2 | 1/2013 | Park |
| 8,379,926 B2 | 2/2013 | Kanhere et al. |
| 8,405,656 B2 | 3/2013 | El Dokor et al. |
| 8,411,149 B2 | 4/2013 | Maison et al. |
| 8,411,932 B2 | 4/2013 | Liu et al. |
| 8,503,720 B2 | 8/2013 | Shotton et al. |
| 2002/0071607 A1 | 6/2002 | Kawamura et al. |
| 2003/0057972 A1 | 3/2003 | Pfaff et al. |
| 2003/0088463 A1 | 5/2003 | Kanevsky |
| 2003/0095698 A1 | 5/2003 | Kawano |
| 2003/0156756 A1 | 8/2003 | Gokturk et al. |
| 2003/0235341 A1 | 12/2003 | Gokturk et al. |
| 2004/0091153 A1 | 5/2004 | Nakano et al. |
| 2004/0174770 A1 | 9/2004 | Rees |
| 2004/0183775 A1 | 9/2004 | Bell |
| 2004/0184640 A1 | 9/2004 | Bang et al. |
| 2004/0184659 A1 | 9/2004 | Bang et al. |
| 2004/0258306 A1 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0094879 A1* | 5/2005 | Harville ........................ 382/209 |
| 2005/0110964 A1 | 5/2005 | Bell et al. |
| 2005/0122308 A1 | 6/2005 | Bell et al. |
| 2005/0162381 A1 | 7/2005 | Bell et al. |
| 2005/0265583 A1 | 12/2005 | Covell et al. |
| 2005/0271279 A1 | 12/2005 | Fujimura et al. |
| 2006/0010400 A1 | 1/2006 | Dehlin et al. |
| 2006/0092138 A1 | 5/2006 | Kim et al. |
| 2006/0115155 A1 | 6/2006 | Lui et al. |
| 2006/0149737 A1 | 7/2006 | Du et al. |
| 2006/0159344 A1 | 7/2006 | Shao et al. |
| 2007/0003141 A1 | 1/2007 | Rittscher et al. |
| 2007/0076016 A1 | 4/2007 | Agarwala et al. |
| 2007/0154116 A1 | 7/2007 | Shieh |
| 2007/0230789 A1 | 10/2007 | Chang et al. |
| 2008/0062123 A1 | 3/2008 | Bell |
| 2008/0094371 A1 | 4/2008 | Forstall et al. |
| 2008/0123940 A1 | 5/2008 | Kundu et al. |
| 2008/0150890 A1 | 6/2008 | Bell et al. |
| 2008/0150913 A1 | 6/2008 | Bell et al. |
| 2008/0226172 A1 | 9/2008 | Connell |
| 2008/0236902 A1 | 10/2008 | Imaizumi |
| 2008/0252596 A1 | 10/2008 | Bell et al. |
| 2008/0256494 A1 | 10/2008 | Greenfield |
| 2008/0260250 A1 | 10/2008 | Vardi |
| 2008/0267458 A1 | 10/2008 | Laganiere et al. |
| 2008/0310706 A1 | 12/2008 | Asatani et al. |
| 2009/0009593 A1 | 1/2009 | Cameron et al. |
| 2009/0027335 A1 | 1/2009 | Ye |
| 2009/0077504 A1 | 3/2009 | Bell |
| 2009/0078473 A1 | 3/2009 | Overgard et al. |
| 2009/0083122 A1 | 3/2009 | Angell et al. |
| 2009/0083622 A1 | 3/2009 | Chien et al. |
| 2009/0096783 A1 | 4/2009 | Shpunt et al. |
| 2009/0116728 A1 | 5/2009 | Agrawal et al. |
| 2009/0183125 A1 | 7/2009 | Magal et al. |
| 2009/0195392 A1 | 8/2009 | Zalewski |
| 2009/0222388 A1 | 9/2009 | Hua et al. |
| 2009/0297028 A1 | 12/2009 | De Haan |
| 2010/0002936 A1 | 1/2010 | Khomo et al. |
| 2010/0007717 A1 | 1/2010 | Spektor et al. |
| 2010/0034457 A1 | 2/2010 | Berliner et al. |
| 2010/0036717 A1 | 2/2010 | Trest |
| 2010/0111370 A1 | 5/2010 | Black et al. |
| 2010/0235786 A1 | 9/2010 | Meizels et al. |
| 2010/0302138 A1 | 12/2010 | Poot et al. |
| 2010/0303289 A1 | 12/2010 | Polzin et al. |
| 2010/0322516 A1 | 12/2010 | Xu et al. |
| 2011/0025689 A1 | 2/2011 | Perez et al. |
| 2011/0052006 A1 | 3/2011 | Gurman et al. |
| 2011/0069866 A1* | 3/2011 | Kim et al. ........................ 382/103 |
| 2011/0123090 A1* | 5/2011 | Zerfass et al. ................ 382/134 |
| 2011/0164032 A1 | 7/2011 | Shadmi |
| 2011/0182477 A1 | 7/2011 | Tamrakar et al. |
| 2011/0237324 A1 | 9/2011 | Clavin et al. |
| 2011/0292036 A1 | 12/2011 | Sali et al. |
| 2011/0293137 A1 | 12/2011 | Gurman et al. |
| 2012/0070070 A1 | 3/2012 | Litvak |
| 2012/0119984 A1* | 5/2012 | Sankarasubramaniam et al. ............................ 345/156 |

FOREIGN PATENT DOCUMENTS

| | | |
|---|---|---|
| WO | 9935633 A2 | 7/1999 |
| WO | 03071410 A2 | 8/2003 |
| WO | 2004107272 A1 | 12/2004 |
| WO | 2005003948 A1 | 1/2005 |
| WO | 2005094958 A1 | 10/2005 |
| WO | 2007043036 A1 | 4/2007 |
| WO | 2007078639 A1 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |

OTHER PUBLICATIONS

Bleiwess et al., "Markerless Motion Capture Using a Single Depth Sensor", SIGGRAPH Asia 2009, Yokohama, Japan, Dec. 16-19, 2009.

Bevilacqua et al., "People Tracking Using a Time-Of-Flight Depth Sensor", Proceedings of the IEEE International Conference on Video and Signal Based Surveillance, Sydney, Australia, Nov. 22-24, 2006.

Bradski, G., "Computer Vision Face Tracking for Use in a Perceptual User Interface", Intel Technology Journal, vol. 2, issue 2 (2nd Quarter 2008).

Comaniciu et al., "Kernel-Based Object Tracking", IEEE Transactions on Pattern Analysis and Machine Intelligence, vol. 25, No. 5, pp. 564-577, May 2003.

Gesturetec Inc., "Gesture Control Solutions for Consumer Devices", Canada, 2009.

(56) References Cited

OTHER PUBLICATIONS

Gokturk et al., "A Time-Of-Flight Depth Sensor—System Description, Issues and Solutions", Proceedings of the 2004 Conference on Computer Vision and Patter Recognition Workshop (CVPRW'04), vol. 3, pp. 35, Jun. 27-Jul. 2, 2004.
Grest et al., "Single View Motion Tracking by Depth and Silhouette Information", SCIA 2007—Scandinavian Conference on Image Analysis, Lecture Notes in Computer Science 4522, pp. 719-729, Aalborg, Denmark, Jun. 10-14, 2007.
Haritaoglu et al., "Ghost 3d: Detecting Body Posture and Parts Using Stereo", Proceedings of the IEEE Workshop on Motion and Video Computing (MOTION'02), pp. 175-180, Orlando, USA, Dec. 5-6, 2002.
Haritaoglu et al., "W4S : a real-time system for detecting and tracking people in 2<1/2>D", ECCV 98—5th European conference on computer vision, vol. 1407, pp. 877-892, Freiburg , Germany, Jun. 2-6, 1998.
Harville, M., "Stereo Person Tracking with Short and Long Term Plan-View Appearance Models of Shape and Color", Proceedings of the IEEE International Conference on Advanced Video and Signal-Based Surveillance (AVSSS-2005), pp. 522-527, Como, Italy, Sep. 15-16, 2005.
Holte, M., "Fusion of Range and Intensity Information for View Invariant Gesture Recognition", IEEE Conference on Computer Vision and Pattern Recognition Workshops (CVPRW '08), pp. 1-7, Anchorage, USA, Jun. 23-28, 2008.
Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.
Kolb et al., "ToF-Sensors: New Dimensions for Realism and Interactivity", Proceedings of the IEEE Conference on Computer Vision and Patter Recognition Workshops, pp. 1-6, Anchorage, USA, Jun. 23-28, 2008.
Kolsch et al., "Fast 2D Hand Tracking with Flocks of Features and Multi-Cue Integration", IEEE Workshop on Real-Time Time Vision for Human Computer Interaction (at CVPR'04), Washington, USA, Jun. 27-Jul. 2, 2004.
Krumm et al., "Multi-Camera Multi-Person Tracking for EasyLiving", 3rd IEEE International Workshop on Visual Surveillance, Dublin, Ireland, Jul. 1, 2000.
Leens et al., "Combining Color, Depth, and Motion for Video Segmentation", ICVS 2009—7th International Conference on Computer Vision Systems, Liege, Belgium Oct. 13-15, 2009.
MacCormick et al., "Partitioned Sampling, Articulated Objects, and Interface-Quality Hand Tracking", ECCV '00—Proceedings of the 6th European Conference on Computer Vision—Part II , pp. 3-19, Dublin, Ireland, Jun. 26-Jul. 1, 2000.
Malassiotis et al., "Real-Time Hand Posture Recognition Using Range Data", Image and Vision Computing, vol. 26, No. 7, pp. 1027-1037, Jul. 2, 2008.
Morano et al., "Structured Light Using Pseudorandom Codes", IEEE Transactions on Pattern Analysis and Machine Intelligence, vol. 20, issue 3, pp. 322-327, Mar. 1998.
Munoz-Salinas et al., "People Detection and Tracking Using Stereo Vision and Color", Image and Vision Computing, vol. 25, No. 6, pp. 995-1007, Jun. 1, 2007.
Nanda et al., "Visual Tracking Using Depth Data", Proceedings of the 2004 Conference on Computer Vision and Patter Recognition Workshop, vol. 3, Washington, USA, Jun. 27-Jul. 2, 2004.
Scharstein et al., "High-Accuracy Stereo Depth Maps Using Structured Light", IEEE Conference on Computer Vision and Patter Recognition, vol. 1, pp. 195-2002, Madison, USA, Jun. 2003.
Shi et al., "Good Features to Track", IEEE Conference on Computer Vision and Pattern Recognition, pp. 593-600, Seattle, USA, Jun. 21-23, 1994.
Siddiqui et al., "Robust Real-Time Upper Body Limb Detection and Tracking", Proceedings of the 4th ACM International Workshop on Video Surveillance and Sensor Networks, Santa Barbara, USA, Oct. 27, 2006.
Softkinetic S.A., IISU™—3D Gesture Recognition Platform for Developers of 3D Applications, Belgium, Brussels, 2007-2010.
Sudderth et al., "Visual Hand Tracking Using Nonparametric Belief Propagation", IEEE Workshop on Generative Model Based Vision at CVPR'04, Washington, USA, Jun. 27-Jul. 2, 2004.
Tsap, L., "Gesture-Tracking in Real Time with Dynamic Regional Range Computation", Real-Time Imaging, vol. 8, issue 2, pp. 115-126, Apr. 2002.
Xu et al., "A Multi-Cue-Based Human Body Tracking System", Proceedings of the 5ths International Conference on Computer Vision Systems (ICVS 2007), Germany, Mar. 21-24, 2007.
Xu et al., "Human Detecting Using Depth and Gray Images", Proceedings of the IEE Conference on Advanced Video and Signal Based Surveillance (AVSS'03), Miami, USA, Jul. 21-22, 2003.
Yilmaz et al., "Object Tracking: A Survey", ACM Computing Surveys, vol. 38, No. 4, article 13, Dec. 2006.
Zhu et al., "Controlled Human Pose Estimation From Depth Image Streams", IEEE Conference on Computer Vision and Patter Recognition Workshops, pp. 1-8, Anchorage, USA, Jun. 23-27, 2008.
International Application PCT/IB2010/051055 Search Report dated Sep. 1, 2010.
La Viola, J. Jr., "Whole-Hand and Speech Input in Virtual Environments", Computer Science Department, Florida Atlantic University, USA, 1996.
Martell, C., "Form: An Experiment in the Annotation of the Kinematics of Gesture", Dissertation, Computer and Information Science, University of Pennsylvania, 2005.
U.S. Appl. No. 61/386,591, filed Sep. 27, 2010.
U.S. Appl. No. 61/349,894, filed May 31, 2010.
U.S. Appl. No. 61/355,574, filed Jun. 17, 2010.
Prime Sense Inc., "Prime Sensor™ NITE 1.1 Framework Programmer's Guide", Version 1.2, year 2009.
U.S. Appl. No. 12/352,622 Official Action dated Mar. 31, 2011.
U.S. Appl. No. 61/365,788, filed Jul. 20, 2010.
U.S. Appl. No. 61/422,239, filed Dec. 13, 2010.
U.S. Appl. No. 61/420,809, filed Dec. 8, 2010.
U.S. Appl. No. 61/448,670, filed Mar. 3, 2011.
U.S. Appl. No. 13/229,727 Office Action dated Mar. 13, 2013.
U.S. Appl. No. 12/854,187 Office Action dated Apr. 19, 2013.
Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.
Li et al., "Statistical modeling of complex backgrounds for foreground object detection", IEEE Transactions on Image Processing, vol. 13, No. 11,pp. 1459-1472, Nov. 2004.
Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.
U.S. Appl. No. 12/854,187, filed Aug. 11, 2010.
U.S. Appl. No. 61/504,339, filed Jul. 5, 2011.
U.S. Appl. No. 61/521,448, filed Aug. 9, 2011.
U.S. Appl. No. 61/523,349, filed Aug. 14, 2011.
Primesense, "Natural Interaction", YouTube Presentation, Jun. 9, 2010 http://www.youtube.com/watch?v=TzLKsex43zl~.
International Application PCT/IB2011/053192 filed on Jul. 18, 2011.
U.S. Appl. No. 61/523,404, filed Aug. 15, 2011.
Hart, D., U.S. Appl. No. 09/616,606 "Method and System for High Resolution , Ultra Fast 3-D Imaging" filed Jul. 14, 2000.
International Application PCT/IL2007/000306 Search Report dated Oct. 2, 2008.
International Application PCT/IL2007/000574 Search Report dated Sep. 10, 2008.
International Application PCT/IL2006/000335 Preliminary Report on Patentability dated Apr. 24, 2008.
Avidan et al., "Trajectory triangulation: 3D reconstruction of moving points from amonocular image sequence", IEEE Transactions on Pattern Analysis and Machine Intelligence (PAMI), vol. 22, No. 4, pp. 348-3537, Apr. 2000.
Leclerc et al., "The direct computation of height from shading", The Proceedings of the IEEE Computer Society Conference on Computer Vision and Pattern Recognition (CVPR), pp. 552-558, USA, Jun. 1991.

(56) References Cited

OTHER PUBLICATIONS

Zhang et al., "Shape from intensity gradient", IEEE Transactions on Systems, Man and Cybernetics—Part A: Systems and Humans, vol. 29, No. 3, pp. 318-325, May 1999.
Zhang et al., "Height recovery from intensity gradients", IEEE Computer Society Conference on Computer Vision and Pattern Recognition (CVPR), pp. 508-513, Jun. 21-23, 1994.
Horn, B., "Height and gradient from shading", International Journal of Computer Vision, vol. 5, No. 1, pp. 37-76, Aug. 1990.
Bruckstein, A., "On shape from shading", Computer Vision, Graphics & Image Processing, vol. 44, pp. 139-154, year 1988.
Zhang et al., "Rapid Shape Acquisition Using Color Structured Light and Multi-Pass Dynamic Programming", 1st International Symposium on 3D Data Processing Visualization and Transmission (3DPVT), Italy, Jul. 2002.
Besl, P., "Active, Optical Range Imaging Sensors", Machine vision and applications, vol. 1, pp. 127-152, year 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence (PAMI), vol. 10, No. 5, pp. 749-754, Sep. 1988.
Winkelbach et al., "Shape from Single Stripe Pattern Illumination", Luc Van Gool (Editor), (DAGM 2002), Lecture Notes in Computer Science 2449, p. 240-247, Springer 2002.
Koninckx et al., "Efficient, Active 3D Acquisition, based on a Pattern-Specific Snake", Luc Van Gool (Editor), (DAGM 2002), Lecture Notes in Computer Science 2449, pp. 557-565, Springer 2002.
Kimmel et al., "Analyzing and synthesizing images by evolving curves with the Osher-Sethian method", International Journal of Computer Vision, vol. 24, No. 1, pp. 37-56, year 1997.
Zigelman et al., "Texture mapping using surface flattening via multi-dimensional scaling", IEEE Transactions on Visualization and Computer Graphics, vol. 8, No. 2, pp. 198-207, Apr. 2002.
Dainty, J.C., "Introduction", Laser Speckle and Related Phenomena, pp. 1-7, Springer-Verlag, Berlin Heidelberg, 1975.
Mendlovic et al., "Composite harmonic filters for scale, projection and shift invariant pattern recognition", Applied Optics Journal, vol. 34, No. 2, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality", Immersive Projection Technology, Iowa State University, year 2004.
Howe et al., "Bayesian Reconstruction of 3D Human Motion from Single-Camera Video", Advanced in Neural Information Processing Systems, vol. 12, pp. 820-826, USA 1999.
Li et al., "Real-Time 3D Motion Tracking with Known Geometric Models", Real-Time Imaging Journal, vol. 5, pp. 167-187, Academic Press 1999.
Grammalidis et al., "3-D Human Body Tracking from Depth Images Using Analysis by Synthesis", Proceedings of the IEEE International Conference on Image Processing (ICIP2001), pp. 185-188, Greece, Oct. 7-10, 2001.
Segen et al., "Shadow gestures: 3D hand pose estimation using a single camera", Proceedings of IEEE International Conference on Computer Vision and Pattern Recognition, pp. 479-485, Fort Collins, USA, 1999.
Vogler et al., "ASL recognition based on a coupling between HMMs and 3D motion analysis", Proceedings of IEEE International Conference on Computer Vision, pp. 363-369, Mumbai, India, 1998.
U.S. Appl. No. 12/683,452, filed Jan. 7, 2010.
Nesbat, S., "A System for Fast, Full-Text Entry for Small Electronic Devices", Proceedings of the 5th International Conference on Multimodal Interfaces, ICMI 2003, Vancouver, Nov. 5-7, 2003.
Ascension Technology Corporation, "Flock of Birds: Real-Time Motion Tracking", 2008.
Segen et al., "Human-computer interaction using gesture recognition and 3D hand tracking", ICIP 98, Proceedings of the IEEE International Conference on Image Processing, vol. 3, pp. 188-192, Oct. 4-7, 1998.
Dekker, L., "Building Symbolic Information for 3D Human Body Modeling from Range Data", Proceedings of the Second International Conference on 3D Digital Imaging and Modeling, IEEE computer Society, pp. 388-397, 1999.
Holte et al., "Gesture Recognition using a Range Camera", Technical Report CVMT-07-01 ISSN 1601-3646, Feb. 2007.
Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, 2007.
Nam et al., "Recognition of Hand Gestures with 3D, Nonlinear Arm Movements", Pattern Recognition Letters, vol. 18, No. 1, pp. 105-113, Elsevier Science B.V. 1997.
Chinese Patent Application # 200780013930 Official Action dated Nov. 17, 2011.
Japanese Patent Application # 2009508667 Official Action dated Nov. 24, 2011.
U.S. Appl. No. 12/300,086 Official Action dated Jan. 17, 2012.
U.S. Appl. No. 61/609,386, filed Mar. 12, 2012.
Rodgers et al., "Object Pose Detection in Range Scan Data", IEEE Conference on Computer Vision and Pattern Recognition, pp. 2445-2452, New York, USA, Jun. 17-22, 2006.
Shotton et al., "Real-Time Human Pose Recognition in Paris from Single Depth Images", 24th IEEE Conference on Computer Vision and Pattern Recognition, Colorado Springs, USA, Jun. 20-25, 2011.
Jiang, H., "Human Pose Estimation Using Consistent Max-Covering", 12th IEEE International Conference on Computer Vision, Kyoto, Japan, Sep. 27-Oct. 4, 2009.
Ramanan, D., "Learning to Parse Images of Articulated Bodies", Neural Information Processing Systems Foundation year 2006.
Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.
Submuth et al., "Ridge Based Curve and Surface Reconstruction", Eurographics Symposium on Geometry Processing, Barcelona, Spain, Jul. 4-6, 2007.
Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.
Cohen et al., "Interference of Human Postures by Classification of 3D Human Body Shape", IEEE International Workshop on Analysis and Modeling of Faces and Gestures, ICCV 2003, Nice, France, Oct. 14-17, 2003.
Agarwal et al., "3D Human Pose from Silhouettes by Relevance Vector Regression", Proceedings of the IEEE Conference on Computer Vision and Pattern Recognition, vol. 2, pp. 882-888, Jun. 27-Jul. 2, 2004.
Borenstein et al., "Combining Top-down and Bottom-up Segmentation", Proceedings of the IEEE Conference on Computer Vision and Pattern Recognition, Jun. 27-Jul. 2, 2004.
Karlinsky et al., "Combined Model for Detecting, Localizing, Interpreting and Recognizing Faces", Faces in Real-Life Images workshop, European Conference on Computer Vision, France, Oct. 12-18, 2008.
Ullman, S., "Object Recognition and Segmentation by a Fragment-Based Hierarchy", Trends in Cognitive Sciences, vol. 11, No. 2, pp. 58-64, Feb. 2007.
Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.
Ramanan et al., "Training Deformable Models for Localization", Proceedings of the 2006 IEEE Conference on Computer Vision and Pattern Recognition, pp. 206-213, New York, USA, Jun. 17-22, 2006.
U.S. Appl. No. 12/854,188 Official Action dated Nov. 26, 2012.

(56) References Cited

OTHER PUBLICATIONS

U.S. Appl. No. 13/867,083 Office Action dated Oct. 23, 2013.
U.S. Appl. No. 13/867,085 Office Action dated Nov. 7, 2013.
Krumm et al., "Multi-camera multi person tracking for EasyLiving"., Visual surveillance, 2000, Proceedings, Third International workshop pp. 1-8, 2000.
Yous et al., "People detection and tracking with World -Z map from single stereo camera".,Visual surveillance, 2008, Eighth International workshop , pp. 1-8, 2008.
Damen et al., "Detecting carried objects in short video sequences", ECCV , School of computing, University of Leeds, pp. 1-14, 2008.
Ran et al., "Multi moving people detection from binocular sequences", Center for Automation Research Institute of Advanced Computer Studies, University of Maryland, pp. 1-4, 2003.
Balcells et al., "An appearance—based approach for consistent labeling of humans and objects in video", Pattern Analysis and Application, pp. 373-385, 2004.
Cucchiara et al., "Track-based and object-based occlusion for people tracking refinement indoor surveillance", VSSN, pp. 1-7, 2004.
Ess et al., "Improved multi-person tracking with active occlusion handling", ICRA workshop of people Detection and tracking, pp. 1-6, 2009.

* cited by examiner

TRACKING BODY PARTS BY COMBINED COLOR IMAGE AND DEPTH PROCESSING

CROSS-REFERENCE TO RELATED APPLICATION

This application claims the benefit of U.S. Provisional Patent Application 61/308,996, filed Mar. 1, 2010, whose disclosure is incorporated herein by reference.

FIELD OF THE INVENTION

The present invention relates generally to image processing, and specifically to localizing and segmenting objects in an image.

BACKGROUND

Various techniques are known in the art for automatic computerized segmentation and identification of parts of a human body that appear in an image or image stream. These techniques are used in a variety of computer vision applications, such as in gesture-driven user interfaces. For example, PCT International Publication WO 03/071410, whose disclosure is incorporated herein by reference, describes a gesture recognition system using depth-perceptive sensors. The gestures are recognized based on the shape of the body part and its position and orientation over an interval. Another gesture-based user interface is described in U.S. Patent Application Publication 2010/0235786, whose disclosure is likewise incorporated herein by reference.

Methods of segmentation and body part identification have been applied to both two-dimensional (2D) images, such as color video images, and to three-dimensional (3D) images, also referred to as depth images or depth maps. (In a depth image, each pixel has a value indicating the distance from the camera to the corresponding point in the scene, rather than the brightness and color of the point as in a 2D image.) Both 2D and 3D processing approaches have been found to have respective advantages and drawbacks in this regard.

Recently, some researchers have attempted to combine color and depth processing in order to segment and identify body parts. For example, Bleiweiss and Werman describe a technique of this sort in "Fusing Time-of-Flight Depth and Color for Real-Time Segmentation and Tracking," *Dyn3D '09 Proceedings of the DAGM 2009 Workshop on Dynamic 3D Imaging* (Springer-Verlag, 2009), pages 58-69, which is incorporated herein by reference. The authors present a framework for real-time segmentation and tracking by fusing depth and RGB color data using a mean shift-based algorithm.

Munoz-Salinas, et al., describe another combined processing method in "People Detection and Tracking Using Stereo Vision and Color," *Image and Vision Computing* 25 (2007), pages 995-1007, which is also incorporated herein by reference. The authors describe a system that tracks people by using a Kalman filter to combine color and position information. They note that tracking based exclusively on position information is unreliable when people establish close interactions, and they therefore also include color information about the people's clothes.

SUMMARY

Embodiments of the present invention that are described hereinbelow provide improved methods, systems and software for localizing and tracking parts of a body in color and depth images.

There is therefore provided, in accordance with an embodiment of the present invention, a method for image processing, which includes receiving a depth image of a scene containing a human subject and receiving a color image of the scene containing the human subject. A part of a body of the subject is identified in at least one of the images. A quality of both the depth image and the color image is evaluated, and responsively to the quality, one of the images is selected to be dominant in processing of the part of the body in the images. The identified part in the dominant one of the images is localized, while using supporting data from the other one of the images.

In some embodiments, receiving the depth image includes projecting patterned optical radiation toward the subject, and capturing and processing a two-dimensional image of the patterned optical radiation that is reflected from the subject. In a disclosed embodiment, the patterned optical radiation includes a spatial pattern, and processing the two-dimensional image includes deriving depth coordinates of the body of the subject based on transverse shifts of the spatial pattern in the two-dimensional image. Projecting the patterned optical radiation may include projecting infrared radiation.

In some embodiments, the part of the body includes a hand of the human subject. Typically, localizing the identified part includes identifying a group of pixels belonging to the hand, fitting a parametric model to the group, and finding an orientation of the hand based on a parameter of the model. Fitting the parametric model may include fitting an ellipse to the group, wherein finding the orientation includes finding a direction of an axis of the ellipse. Additionally or alternatively, localizing the identified part includes detecting an initial location of the hand by recognizing, in a sequence of the images, a predetermined focal gesture made by the hand, and then tracking the hand beginning from the initial location.

In the disclosed embodiments, localizing the identified part includes deriving from the depth image and color image respective matrix data structures, having dimensions corresponding to the dimensions of the depth image and color image, and combining at least a part of the respective matrix data structures in order to find a location of the part of the body. Deriving the respective matrix data structures may include deriving respective masks indicating pixels that are candidates to belong to the part of the body, wherein combining the respective matrix data structures includes applying a logical operation to the respective masks. At least one of the matrix data structures may be indicative of the pixels in at least one of the images in which significant changes occurred over a sequence of the images, thereby representing motion in the images. Additionally or alternatively, at least one of the matrix data structures may be indicative of morphological features of the part of the body.

In one embodiment, deriving the respective matrix data structures includes deriving from the depth image and color image respective maps containing graded values expressing an ascending monotonic function associated with a property of interest at pixels in the images, and combining the respective matrix data structures includes applying a mathematical operation to the respective maps. The graded values may indicate respective probabilities that the pixels to belong to the part of the body, wherein applying the mathematical operation includes multiplying the respective maps together in order to find the location of the part of the body.

In one embodiment, selecting the one of the images includes selecting the color image to be the dominant one, and localizing the identified part includes identifying a range of depths in which the part of the body is located, and filtering the color image using depth coordinates from the depth image to eliminate pixels that are outside the range. In another embodiment, selecting the one of the images includes selecting the depth image to be the dominant one, and localizing the identified part includes identifying a range of colors associated with the part of the body, and filtering the depth image using color information from the color image to eliminate pixels having colors that are outside the range.

In a disclosed embodiment, localizing the identified part includes applying a location and motion filter to a sequence of the depth and color images in order to combine depth- and color-based information from the images.

In some embodiments, localizing the identified part includes tracking the identified part over a sequence of the images. The identified part may be tracked by processing at least some of the images in the sequence using both the supporting data and information from one or more previous images in the sequence.

There is also provided, in accordance with an embodiment of the present invention, apparatus for image processing, including an input interface coupled to receive a depth image of a scene containing a human subject and to receive a color image of the scene containing the human subject. A processor is configured to identify a part of a body of the subject in at least one of the images, to evaluate a quality of both the depth image and the color image, and to select, responsively to the quality, one of the images to be dominant in processing of the part of the body in the images, and to localize the identified part in the dominant one of the images, while using supporting data from the other one of the images.

There is additionally provided, in accordance with an embodiment of the present invention, a computer software product, including a computer-readable medium in which program instructions are stored, which instructions, when read by a computer, cause the computer to receive a depth image of a scene containing a human subject and to receive a color image of the scene containing the human subject, to identify a part of a body of the subject in at least one of the images, to evaluate a quality of both the depth image and the color image, and to select, responsively to the quality, one of the images to be dominant in processing of the part of the body in the images, and to localize the identified part in the dominant one of the images, while using supporting data from the other one of the images.

There is further provided, in accordance with an embodiment of the present invention, a method for image processing, which includes receiving a depth image of a scene containing a human subject and receiving a color image of the scene containing the human subject. A part of a body of the subject is identified in at least one of the images. A quality of both the depth image and the color image is evaluated, and responsively to the quality, one of the images is selected to be dominant in processing of the part of the body in the images. The identified part in the dominant one of the images is segmented, while using supporting data from the other one of the images.

The present invention will be more fully understood from the following detailed description of the embodiments thereof, taken together with the drawings in which:

DETAILED DESCRIPTION OF EMBODIMENTS

Overview

Figure 1:
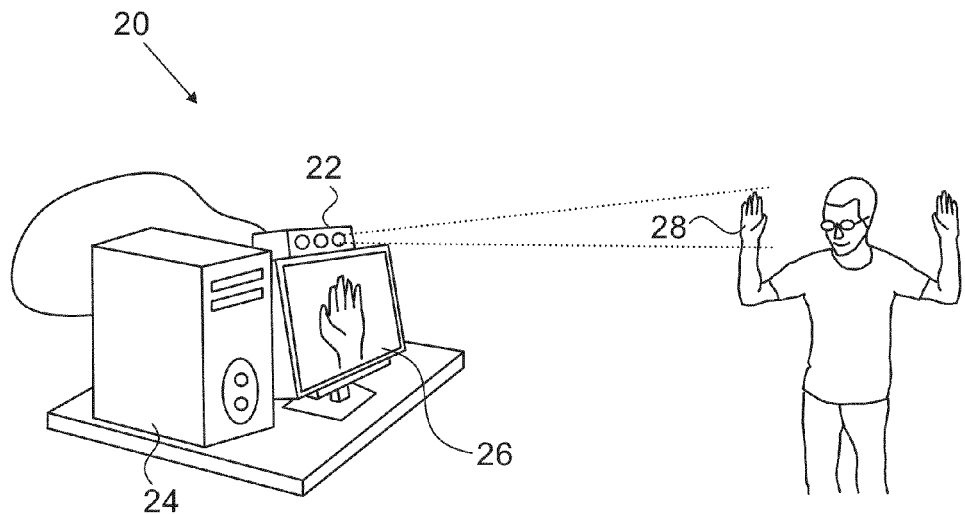
FIG. 1 is a schematic pictorial illustration of a system for 3D and color imaging, in accordance with an embodiment of the present invention.

In computerized gesture recognition systems, identifying and tracking the user's hands is particularly important, and at the same time difficult. The hands are relatively small and move freely and rapidly from one image frame to the next. The apparent shapes of the hands change, as well, as the user changes their orientation and opens or closes the fingers. Occlusions and interactions with other body parts make the space of possible hand appearances even larger and more complex to process.

Using a sequence of depth images for hand segmentation, detection, and tracking, has advantages over color video streams in this regard. The advantages are particularly marked when active 3D imaging is used. The term "active 3D imaging" is used in the context of the present patent application to refer to techniques in which a pattern of optical radiation is projected onto an object and an image of the patterned radiation reflected from the object is captured by an imaging device. The pattern may be a spatial pattern (as in patterned illumination imaging systems) or a temporal pattern (as in time-of-flight imaging systems), or may contain a combination of spatial and temporal patterns. The depth information provided by the active 3D imaging system is in many cases more stable than in passive 3D systems (such as stereoscopic imaging systems), since it is less sensitive to the color and reflective properties of the object. In addition, the depth of tracked objects is typically different from the background depth and therefore provides unambiguous object-background segmentation.

Even active 3D imaging, however, can encounter difficulties in tracking objects of highly variable appearance, such as the hands, due to their changing shape, pose and location. Furthermore, active 3D imagers are sensitive to bright ambient light in the wavelength range of the patterned radiation and generally have limited spatial resolution.

Embodiments of the present invention that are described hereinbelow address these issues by combining depth and color images in a novel way to enhance segmentation, detection and tracking of body parts, and particularly hands. The disclosed techniques provide a high detection rate of the relevant hand and accurate, uninterrupted tracking in a large range of uncontrolled ambient lighting conditions. These techniques are useful, for example, in gesture-based user interfaces. Other possible applications include computer games, in which the objects or figures in the game are controlled by hand motion, and surveillance applications, in which the hand motions of a suspect are tracked to detect potentially hostile activity.

In the disclosed embodiments, a processor applies two different segmentation and tracking algorithms to parallel streams of depth and color images of a scene: a depth-dominant algorithm and a color-dominant algorithm. The depth and color image streams are synchronized in time and are spatially registered with one another. Each algorithm is tuned for the unique properties of its respective dominant image stream, while using information provided by the other stream.

For each pair of image frames in the two streams, the processor evaluates the quality of both the depth image and the color image in the vicinity of a body part of interest, such as the user's hand. Based on the relative quality, the processor selects one of the images (and the corresponding algorithm) to be dominant in processing of the body part in question. The selection is made dynamically and may change from frame to frame in the streams, and even in different spatial parts of the same frame. The processor uses the dominant image and algorithm in localizing the body part, i.e., estimating its location and possibly orientation, with the assistance of supporting data from the other image. For example, the color-dominant tracking algorithm may exploit depth data to avoid tracking objects that are significantly behind the user's body; while the depth-dominant tracking algorithm may use skin color data to improve recognition and segmentation of the hand, particularly when the hand is near the torso, as the hand color is typically different from the color of the user's clothes.

As noted earlier, active 3D imaging tends to suffer in conditions of strong ambient light, in which color imaging generally excels. On the other hand, color imaging gives poor results in dim image areas. Since the useful information contents of the two types of images depend in an inverse manner on the lighting conditions, the collaborative use of the two different types of imagers and algorithms in embodiments of the present invention enables reliable tracking under a wide variety of conditions.

System Description

FIG. 1 is a schematic, pictorial illustration of a system 20 for 3D mapping and imaging, in accordance with an embodiment of the present invention. In this example, an imaging assembly 22 is configured to capture and process 3D and color images of a user (who is thus the "object" of system 20, as well as its operator), and specifically to find the location and orientation of the user's hand 28. This information may be used by a host computer 24 as part of a 3D user interface, which enables the user to interact with games and other applications running on the computer. (This sort of functionality is described, for example, in U.S. Patent Application Publication 2009/0183125, whose disclosure is incorporated herein by reference.) This particular application of system 20 is shown here only by way of example, however, and the imaging and hand tracking capabilities of system 20 may be used for other purposes, as well, and applied to other types of 3D objects.

In the example shown in FIG. 1, imaging assembly 22 projects a pattern of optical radiation onto the body (or at least parts of the body) of the user, and captures an image of the pattern that appears on the body surface. The optical radiation that is used for this purpose is typically, although not necessarily, in the infrared (IR) range. A processor in assembly 22, whose functionality is described in greater detail hereinbelow, processes the image of the pattern in order to generate a depth map of the body, i.e., an array of 3D coordinates, comprising a depth (Z) coordinate value of the body surface at each point (X,Y) within a predefined field of view. (In the context of an array of image-related data, these (X,Y) points are also referred to as pixels.) For example, the processor may compute the 3D coordinates of points on the surface of the user's body by triangulation, based on transverse shifts of the spots in the pattern, as described in PCT International Publications WO 2007/043036, WO 2007/105205 and WO 2008/120217, whose disclosures are incorporated herein by reference. This sort of technique is referred to herein as "pattern-based depth mapping."

In addition, imaging assembly 22 captures color (2D) images of the user. The imaging assembly registers and synchronizes the depth maps with the color images, thus providing the basis to reconstruct a 3D color image of the user. Assembly 22 generates a data stream that includes the depth maps and image data for output to computer 24. These functions of assembly 22 are described further in U.S. Patent Application 2010/0007717, whose disclosure is incorporated herein by reference.

Computer 24 processes the data generated by assembly in order to extract 3D image information. For example, the computer may segment the depth map in order to identify hand 28 and find its 3D location and orientation. Computer 24 may use this information in driving an output device, such as a display 26, to present 3D image information and/or user interface elements that may be controlled by movements of parts of the user's body. Generally, computer 24 comprises a general-purpose computer processor, which is programmed in software to carry out these functions. The software may be downloaded to the processor in electronic form, over a network, for example, or it may alternatively be provided on tangible media, such as optical, magnetic, or electronic memory media.

As another alternative, the processing functions that are associated here with computer 24 may be carried out by a suitable processor in assembly 22 or a processor that is integrated with display 26 (in a television set, for example) or with any other suitable sort of computerized device, such as a game console or media player. The segmentation and tracking functions of the computer or other processor may be used not only in the above-mentioned user interface applications, but also in other applications that depend on identifying and/or tracking body parts, as well as other moving objects.

Figure 2:
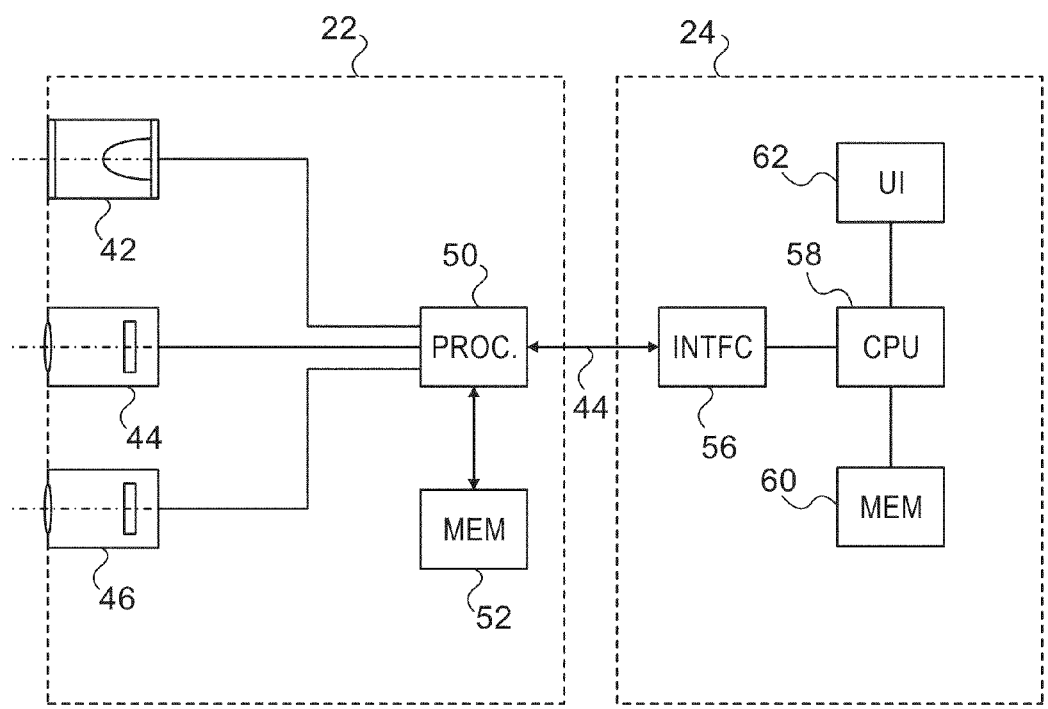
FIG. 2 is a block diagram that schematically shows functional components of the system of FIG. 1, in accordance with an embodiment of the present invention.

FIG. 2 is a block diagram that schematically illustrates elements of imaging assembly 22 and computer 24 in system 20, in accordance with an embodiment of the present invention. Imaging assembly 22 comprises an illumination subassembly 42, which projects a pattern of optical radiation onto the scene of interest. A depth imaging subassembly 44, such as a suitably-configured video camera, captures images of the pattern on the scene. Typically, illumination subassembly 42 and imaging subassembly 44 operate in the infrared range, although other spectral ranges may also be used. In addition, a color video camera 46 captures 2D color images of the scene. Alternatively or additionally, the video camera in depth imaging subassembly 44 may provide high-resolution 2D images, as well, which may be used in hand motion and morphology analysis. Further alternatively or additionally, assembly 22 may comprise a monochrome video camera (not shown), which captures gray-scale images that may be processed for such purposes.

A processor 50 receives the images from subassembly 44 and compares the pattern in each image to a reference pattern stored in a memory 52. The reference pattern is typically captured in advance by projecting the pattern onto a reference plane at a known distance from assembly 22. Processor 50 computes local shifts of parts of the pattern in the images captured by subassembly 44 relative to the reference pattern and translates these shifts into depth coordinates. Details of this process are described, for example, in PCT International Publication WO 2010/004542, whose disclosure is incorporated herein by reference. The depth coordinates computed in this fashion become the pixel values in the 3D depth images output by assembly 22. Alternatively or additionally, assembly 22 may be configured to generate depth images by other means that are known in the art, including active methods, such as time-of-flight measurements, as well as passive methods, such as stereoscopic imaging.

Processor 50 synchronizes and registers the depth coordinates in each 3D image with the corresponding pixels in the color images captured by subassembly 46. The registration typically involves a shift of the coordinates associated with each depth value in the 3D image. The shift includes a static component, based on the distance between the optical axes of subassemblies 44 and 46 and any misalignment between the detectors, as well as a dynamic component that is dependent on the depth coordinates themselves. The registration process is described in the above-mentioned WO 2010/004542.

Processor 50 outputs the synchronized and registered depth and color images via a communication link 54, such as a Universal Serial Bus (USB) connection, to a suitable interface 56 of computer 24. The computer comprises a central processing unit (CPU) 58 with a memory 60 and a user interface 62, which drives display 26 and may include other components, as well. Alternatively, imaging assembly 22 may output only raw images from subassembly 44, and the depth computations described above may be performed in software by CPU 58; or as a further alternative, at least some of the functions attributed below to CPU 58 may be carried out by processor 50.

CPU 58 processes the depth and color images to segment and analyze aspects of the user's posture and gestures, including the location and orientation of hand (and possibly other parts of the user's body, as well). Software for extracting higher-level information from the depth maps may run on CPU 58 or processor 50, or both; and references in the present patent application and in the claims to a CPU or to a processor should be understood as referring to either or both of these elements. CPU 58 typically runs one or more application programs, which drive user interface 62 based on hand location and orientation information that is provided via a suitable application program interface (API).

Methods for Hand Tracking

Figure 3:
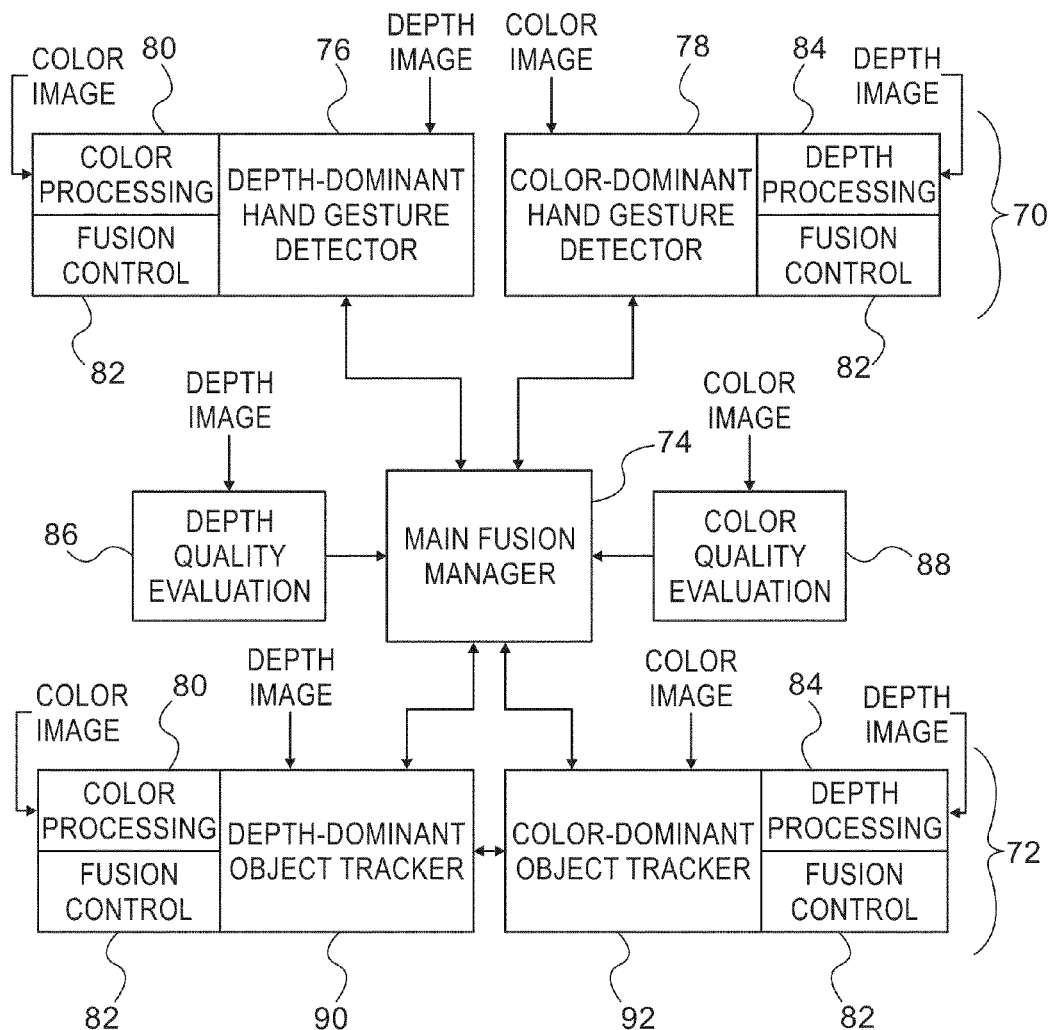
FIG. 3 is a flow chart that schematically illustrates a method for hand detection and tracking, in accordance with an embodiment of the present invention.

FIG. 3 is a flow chart that schematically illustrates a method for hand detection and tracking, in accordance with an embodiment of the present invention. The method has two main stages: a gesture detection stage and a hand tracking stage 72, whose operations are coordinated by a fusion manager 74. Typically (although not necessarily), all of the stages and functional components shown in FIG. 3 run as software routines on CPU 58.

In gesture detection stage 70, CPU 58 attempts to locate hand 28 by detecting in the depth and color image streams a "focus gesture" of the hand that is made anywhere in the scene that is captured by imaging assembly 22. The occurrence of such a gesture supplies the initial location of the hand for hand tracking stage 72. The focus gesture can be, for example, a hand-wave lasting several seconds, a circular or triangular hand motion, or any other motion that is unlikely to occur without user intent. Additionally or alternatively, in some applications, the focus gesture serves as an indicator of the user's intent to initiate interaction with computer 24 (such as to start controlling an electronic appliance or start a computer game).

CPU 58 performs focus gesture detection by scanning the entire depth image and color image in each frame, using depth-dominant and color-dominant hand gesture detectors 76 and 78, respectively. Depth-dominant detector 76 in stage 70 may use color data 80 from the color image, while color-dominant detector 78 may use depth data 84, driven by a fusion control process 82, as explained further hereinbelow. Detectors 76 and 78 attempt to detect hands in the respective images and to track all detected hands simultaneously. CPU 58 may compute hand trajectory information over recent frames for each tracked hand, and may then compare each trajectory with a predefined trajectory that is associated with the focal gesture.

Quality evaluators 86 and 88 evaluate respective quality of the depth and color detection results. For example, quality evaluator 86 may compute the depth quality based on the fraction of pixels at the estimated hand location whose current depth value matches, to within a predefined threshold, the estimated depth of the hand. The color quality, evaluated by quality evaluator 88, may be similarly calculated based on the fraction of pixels matching the estimated hand color. The larger the number of pixels with data matching the estimate, the higher the estimated data quality. Alternatively or additionally, other quality measures may be applied to the depth and color images.

When both of gesture detectors 76 and 78 detect a hand gesture, manager 74 chooses the preferred hand location detected by one of the algorithms based on the estimated depth and color qualities. At this point, gesture detection stage 70 terminates, and hand tracking stage 72 begins. Manager 74 provides the preferred estimate of the hand location at the end of the gesture as input to tracking stage 72. When only one of detectors 76 and 78 detects the hand gesture, manager 74 decides whether to accept this detection as valid, and if so, proceeds to hand tracking stage 72.

In tracking stage 72, CPU 58 tracks hand 28 and estimates the 2D location of the hand in the field of view of imaging assembly 22, its depth (distance from the assembly), and its orientation. The tracking is performed by a depth-dominant object tracker 90 and/or a color-dominant object tracker 92, with the assistance of color data 80 or depth data 84 as noted above. CPU 58 may also track and update other hand parameters, such as finger position, as well as properties such as intensity of reflection and color.

Fusion manager 74 integrates the tracked hand location estimates using input from quality evaluators 86 and 88, and possibly other parameters, as well, such as the distance of the tracked object from assembly 22. For example, if the depth- and color-dominant estimates are close enough to one another, manager 74 may choose the estimated location (depth or color) that has the maximal quality value. On the other hand, if the estimated locations are far apart, manager 74 may choose the hand location that achieved the maximal combined value of depth and color quality. When the object in question is within a certain threshold distance of assembly 22, the depth-dominant hand location may get extra weight in the integrated location decision, because the pattern image is typically of high quality at short distances, and the depth data is therefore reliable. Manager 74 may periodically update the choice between the two trackers and the corresponding preferred estimated hand location. The preferred hand location may be used as input to both trackers 90 and 92 for the tracking of the hand in the next frame.

When computer 24 has limited computational resources, manager 74 may activate only one tracker 90 or in each frame. Manager 74 chooses the tracking algorithm (color-dominant or depth-dominant) for each frame by comparing the color and depth quality evaluations from the previous frame. Quality estimation in this case is performed with respect to the hand location that was found by the single active depth- or color-dominant tracker in the previous frame.

In order to reduce the number of switches between different tracking algorithms, manager 74 may apply a hysteresis mechanism. If color-dominant tracking was previously used, switching to depth-dominant tracking takes place only if for several recent frames, the depth quality was significantly better than the color quality, and vice versa. Reducing the number of switches between tracking algorithms is desirable because each switch causes perturbations in the tracked position and orientation of the hand, and tracking is likely to be less stable in the first few frames following an algorithm switch.

Figure 4:
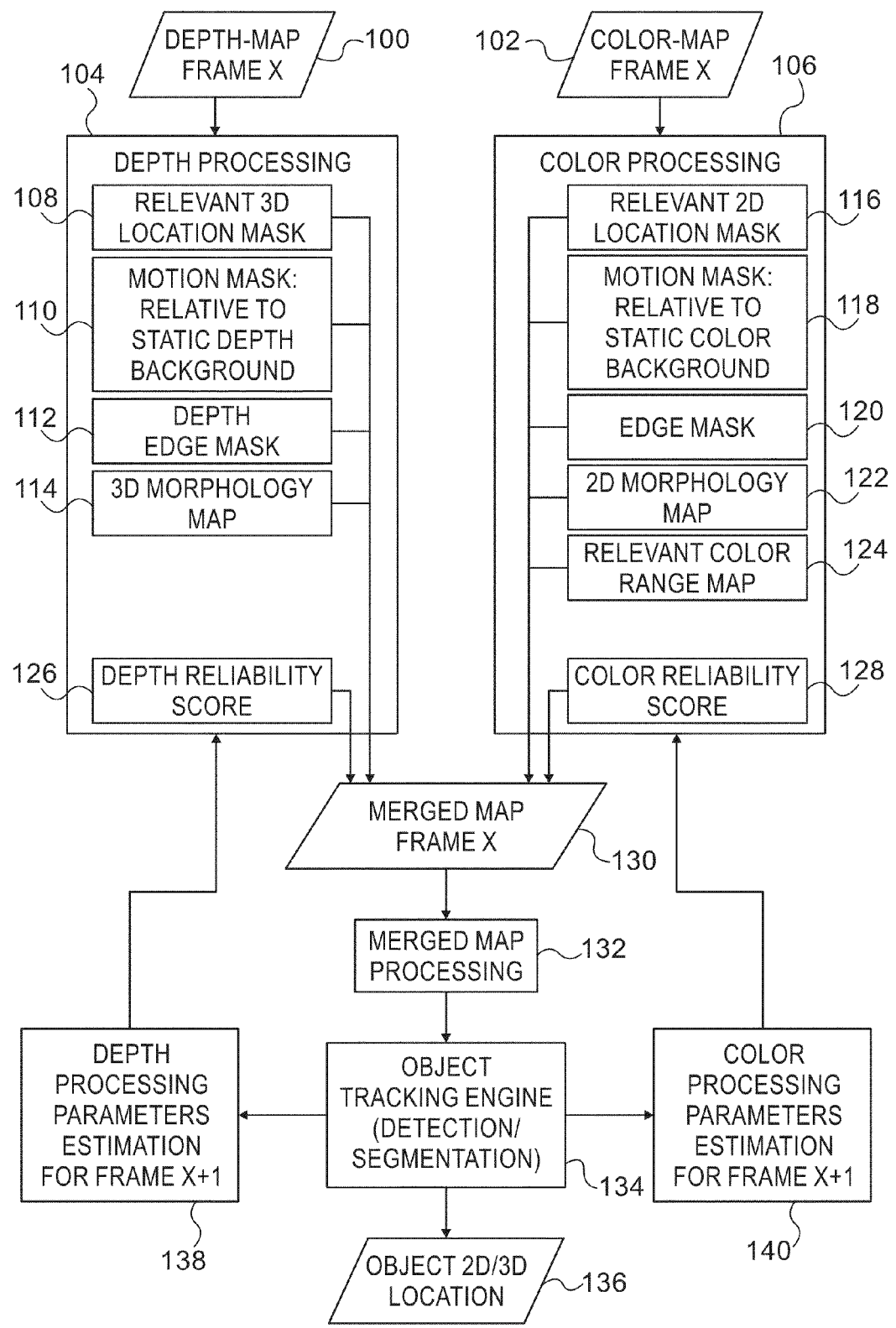
FIG. 4 is a flow chart that schematically illustrates a method for object tracking, in accordance with another embodiment of the present invention.

FIG. 4 is a flow chart that schematically shows details of a method for object tracking, in accordance with an embodiment of the present invention. This method may be used in implementing tracking stage 72. It accepts as input the synchronized and registered sequences of depth and color image frames, referred to in the figure as depth maps 100 and color maps 102, and builds on the basic elements described above with reference to FIG. 3. The method of FIG. 4 is useful particularly in tracking hands, but the principles of the method may also be applied, mutatis mutandis, to tracking objects of other types using depth and color data as input.

In the method of FIG. 4, CPU 58 runs depth- and color-image processing procedures 104 and 106, which have a shared underlying structure that is shown in the figure. Procedures 104 and 106 each comprise a set of processing components, as described below. The different components work independently, and their outputs are then merged by a map merging process 130. Each procedure 104, 106 takes as an input the current depth or color map 100 or 102, and a set of maps and parameters extracted from previous frames. The output of each of the processing components is a matrix data structure, which may be either a "mask" or a "map," with dimensions corresponding to the pixel dimensions of the input depth or color map. A mask pixel has binary values, wherein a positive value of a pixel indicates that the corresponding pixel in the map is likely to be a part of the hand, while a zero value indicates a non-relevant pixel. Map pixels have graded values, which can express any ascending monotonic function associated with a property of interest (for example, motion).

Probability maps are one type of useful map, in which the pixel values fall in the range [0 . . . 1] and represents the estimated probability of the corresponding pixel to be part of the hand. Bayesian statistical rules can be used to combine currently-measured probabilistic evidence with prior information in order to compute a-posteriori probability maps.

Depth-dominant tracking procedure 104 may include some or all of the components listed below. Although some of these components are referred to as maps, and others as mask, these types of data structures may be interchanged in many cases. For example, motion can be represented as either a binary or a graded value, which may be calculated by considering the near environment of each pixel and convolving with a Gaussian kernel. Although specific choices of data structures are listed below for convenience of explanation, other representations may alternatively be used.

A 3D location mask 108—In this mask, a positive pixel is one whose corresponding real-world coordinate (calculated from the 2D coordinates and the sensed depth) is within a certain range of a reference 3D point, such as the initial hand location after a hand-gesture, or the location of the hand in the previous frame.

A motion mask 110 is calculated by comparing the current depth map 100 with a background map. CPU 58 generates the background map by collecting the statistics of depth over many frames and identifying the pixels whose depth values are stable (i.e., vary within no more than a certain minimal range). Pixels with these stable values are assumed to be part of the background of the scene captured by imaging assembly 22, and not parts of the user's body. If the current depth of a pixel is different from its stable (background) depth by more than some minimal threshold, CPU 58 will consider the pixel to be part of a moving object, and the pixel will have a positive motion mask value. This sort of background model and motion mask have been found to be effective in detecting moving hands.

A depth edge mask 112 is generated by applying a 3D variant of an edge detection operator (such as a Sobel or Canny operator, as is known in the art) over the depth map.

A 3D morphology map 114 is calculated by comparing the depth value of each pixel to those of the pixels on a certain geometrical locus, such as a circle, surrounding it. The radius of the circle is typically set to correspond to a real-world distance that is approximately equal to a maximal hand radius. The depth of a hand pixel in the depth map is expected to be significantly smaller than the corresponding background depth. Therefore, if most of the pixels on the surrounding circle have significantly larger depth values than the central pixel, the corresponding morphology map value of the central pixel will be high, indicating a likelihood that the central pixel belongs to a hand. Because forearm pixels typically have similar depth to the hand pixels, a pixel may be assigned a high morphology map value even if not all the pixels on the circle have much larger depth values. Map 114 is typically constructed as a scalar map, rather than a binary mask, in order to take into account that the hand may be near other objects, which will reduce the number of larger-depth pixels on the circle.

Color-dominant tracking process 106 may include the following components, some of which are similar to corresponding components of the edge-dominant tracking process:

A 2D location mask 116—In this mask, pixels receive a positive value if they are within a certain range of a reference 2D point, such as the initial hand location after the hand-gesture, or the location of the hand in the previous frame. The range may be varied in proportion to the approximate arm size that is derived by segmenting the image.

A motion mask 118 is calculated by comparing the current color image with a background color model. The background model captures the stable color value at each pixel based on statistics over many frames.

An edge mask 120 is generated by applying an edge detection operator (such as a Sobel or Canny operator) over the image.

A 2D morphology map 122 is typically calculated in two steps: First, a hand-candidate map is generated by combining a hand color range map 124 (described below) and motion mask 118. At pixels for which the motion mask is positive, the hand-color probability from map 124 is copied to the hand-candidate map. Then, for each pixel in the hand-candidate map, the hand-color probability is compared to those of the pixels on a circle or other geometrical locus around it. The radius of the circle is typically set to the maximal hand radius. For a hand pixel, the hand-color probabilities on the circle are expected to be significantly lower than the center probability. The pixel value at each pixel in 2D morphology map 122 is proportional to the fraction of pixels on the circle that conform with the expected relation.

Hand color range map 124 gives the hand-like color probability for each pixel. This probability is determined by the similarity of the color of the pixel to previously-learned color histograms of the hand. Computation of the histogram and the hand-like color probability is further described below.

For each pair of synchronized input maps 100 and 102, processes 104 and 106 provide a merged map 130 for the corresponding frame (identified in FIG. 4 as "Frame X"), containing the corresponding masks and maps. Processes 104 and 106 also provide a corresponding depth reliability score 126 and color reliability score 128, which may be based, for example, on the types of quality measures that were described above.

A map merging process 132 combines at least a part of the information in the depth and color masks and maps, pixel by pixel, using logical and mathematical operations. The mathematical operations may include, for example, multiplication and/or summation (including weighted summation), as well as probability calculations.

Process 132 applies logical operations, such as AND, OR, NOT and their combinations, pixel by pixel over the depth- and color-related masks. (It is also possible to perform these operations over probability maps with graded values by first thresholding the probability values to transform the maps into binary masks.) The logical operations can be chosen based on the previously-measured reliability of the information expressed in the masks. For example, if both depth- and color-related masks are known to include the object of interest with the addition of some irrelevant pixels, an AND operation will ensure that the combined mask still includes the object of interest while reducing the level of noise. When the depth- and color-related maps contain complementary information, such as in cases in which some areas in the scene are illuminated with strong ambient light and others are dim, an OR operation may be useful, since the color-based mask provides information in the brightly-lit areas, while the depth-based mask provides information in the weakly-lit areas.

In cases in which both the color and depth maps provide useful information, but the reliability of information is difficult to estimate, combining probability maps using multiplication may be more effective. After multiplying the maps together pixel by pixel to give a merged map, a mask may then be generated by applying a threshold to the product of the probabilities at each pixel. Occasionally, the information content and the corresponding probability value in one of the maps may be low in the area of the object of interest. As a result, the product of the probabilities will be low even when the other map contains useful information. To prevent incorrect results in such areas, a minimal probability value can be set at pixels whose original value is below some threshold, and the product between the probability maps can be calculated using this minimal probability value rather than the original value.

A number of different thresholds may be used in merging maps using the steps described above. These thresholds can be dynamically estimated and updated during tracking based on the values of pixels at the location of the tracked hand.

An object tracking engine 134 processes the merged map in order to find and output a location 136 of hand 28. Engine 134 may operate in either color-dominant or depth-dominant mode, as described below, and may optionally apply both processing modes in parallel. Engine 134 also uses the hand location and other map features as an estimate of depth processing parameters 138 and color processing parameters 140 to be applied in processing the next frame.

Color-Dominant Hand Location Tracking with Fusion of Depth Information

Tracking engine 134 may track the hand location in the color-dominant mode using one or a combination of the following methods:

1. Color image data may be filtered based on a range of hand-like colors, using methods similar to those, for example, in the CAMSHIFT algorithm described by Bradski in "Computer Vision Face Tracking For Use in a Perceptual User Interface," *Intel Technology Journal* (1998), which is incorporated herein by reference. The color image is converted to HSV (hue, saturation, value) color space. The hue and saturation components are compared to corresponding histograms that describe expected hand hue and saturation levels. For each pixel, the match to the expected value is expressed as a pixel probability. The hue and saturation probability maps are then multiplied, and the result is the estimated skin-like color probability. This map can be used for filtering points in the vicinity of possible hand locations. The hue and saturation histograms are updated from time to time based on the color values of the pixels in the detected hand location.

2. Background pixels may be segmented from the foreground using motion derived from color data. A method that may be used for this purpose is described, for example, by KaewTraKulPong and Bowden, in "An Improved Adaptive Background Mixture Model for Real-Time Tracking with Shadow Detection," in *Proceedings of the 2nd European Workshop on Advanced Video Based Surveillance Systems*—AVBS '01 (Kingston, UK, 2001), which is incorporated herein by reference. Pixels in the current frame whose color is significantly different from the learned background model are considered "moving foreground," and may be part of a moving hand. The moving foreground is used in filtering relevant hand-candidate locations.

3. Interest point tracking may be applied to follow the location of the moving hand. Algorithms that may be used for this purpose are described, for example, by Kölsch and Turk, in "Fast 2D Hand Tracking with Flocks of Features and Multi-Cue Integration," *IEEE Workshop on Real-Time Vision for Human-Computer Interaction—CVPR* 2004 (2004); and by Shi and Tomasi, in "Good Features to Track," *Conference on Computer Vision and Pattern Recognition—CVPR '94* (1994), pages 593-600, which are incorporated herein by reference. To track the hand location, the color image is converted to a gray-scale image, and sparse optical flow is used for tracking interest points found using the Harris operator (as described in the above references). At each frame, the Harris points in the approximated hand location are tracked between the gray-level image of the previous frame and the current frame, and a new hand location is evaluated based on the tracked points. If the number of successfully-tracked points is below a certain threshold, new Harris points at the approximate hand location are calculated and added to the list of tracked points.

Tracking engine 134 may refine the color-based tracking results with depth-based information as follows: An expected depth is chosen in some range around the original depth found during gesture detection stage 70 (FIG. 3). This expectation will be valid as long as the user stays in the same place during the tracking period, and may be updated otherwise. The expected depth range of the hand can be used in conjunction with the depth image in each frame to filter out irrelevant points from the color image.

This filtering can be done in several steps:

Tracking engine 134 estimates the reliability of the depth information in the previous frame.

For color tracking (method 1 above): If the depth reliability is greater than a certain threshold, the tracking engine applies a depth-based filter over the color image, and then applies the color-based tracking method described above over the filtered image, rather than the original image.

For sparse optical flow tracking (method 3 above): If the depth reliability is greater than a certain threshold, the tracking engine uses depth data to filter out irrelevant Harris points tracked from the previous frame. In this case, the gray-scale image itself is not filtered, as this filtering may induce tracking errors. Any new Harris points are also filtered using the relevant depth range.

The tracking engine evaluates the depth at the pixels of the new hand location. If the depth is known at most of these pixels and is within the expected range, then the depth is considered reliable at the hand location, and the depth map is used in the next frame.

Once tracking engine 134 finds an approximate hand location, using one or more of the above methods, it may then fine-tune the exact location and detect the hand orientation as follows:

1. The tracking engine creates a fusion mask by taking the logical AND of:
   Depth mask: pixels whose depth is within the range in which the hand has been found.
   Color mask: (a) Convert the RGB image to HSV image format; then (b) Take pixels whose hue and saturation levels are within the color range of the hand. (This range may also be tracked and updated.)
   Color motion mask: pixels whose color is sufficiently different (by at least a given threshold) from the color of the background model, generated using statistics of pixels with stable color over many frames.
2. The tracking engine then uses the fusion mask in the following steps:
   Localization of a parametric model of the hand, such as an ellipse representing the shape of the hand. The tracking engine finds the exact ellipse location that optimally matches color edges near the contour of the fusion mask.
   Color tracking—generate the color histograms to be used in updating the hand location in the next frame.
   Hand depth estimation—find the depth to be used in the depth mask for the next frame, using the mean depth of the pixels that fall within a dilated version of the fusion mask.
   Update of the background color model using the current color image. To prevent hand pixels from merging into the background, pixels whose coordinates are part of the fusion mask are not updated.

In this color-dominant tracking model, the use of depth data significantly reduces the chance of losing the tracked hand in favor of spurious objects and artifacts, such as nearby objects with skin-like color (for example, brown/red shirts and painted backgrounds) and other uncovered body parts, including the face and possibly the forearm. The use of depth data also reduces tracking errors due to other people moving behind or in front of the tracked hand, as well as moving shadows behind the user. The availability of depth-based detection results improves and stabilizes the exact localization of the hand, particularly in areas in which the lighting conditions are marginal, and helps to avoid losing the tracked hand due to abrupt strong changes of lighting conditions.

Figure 5:
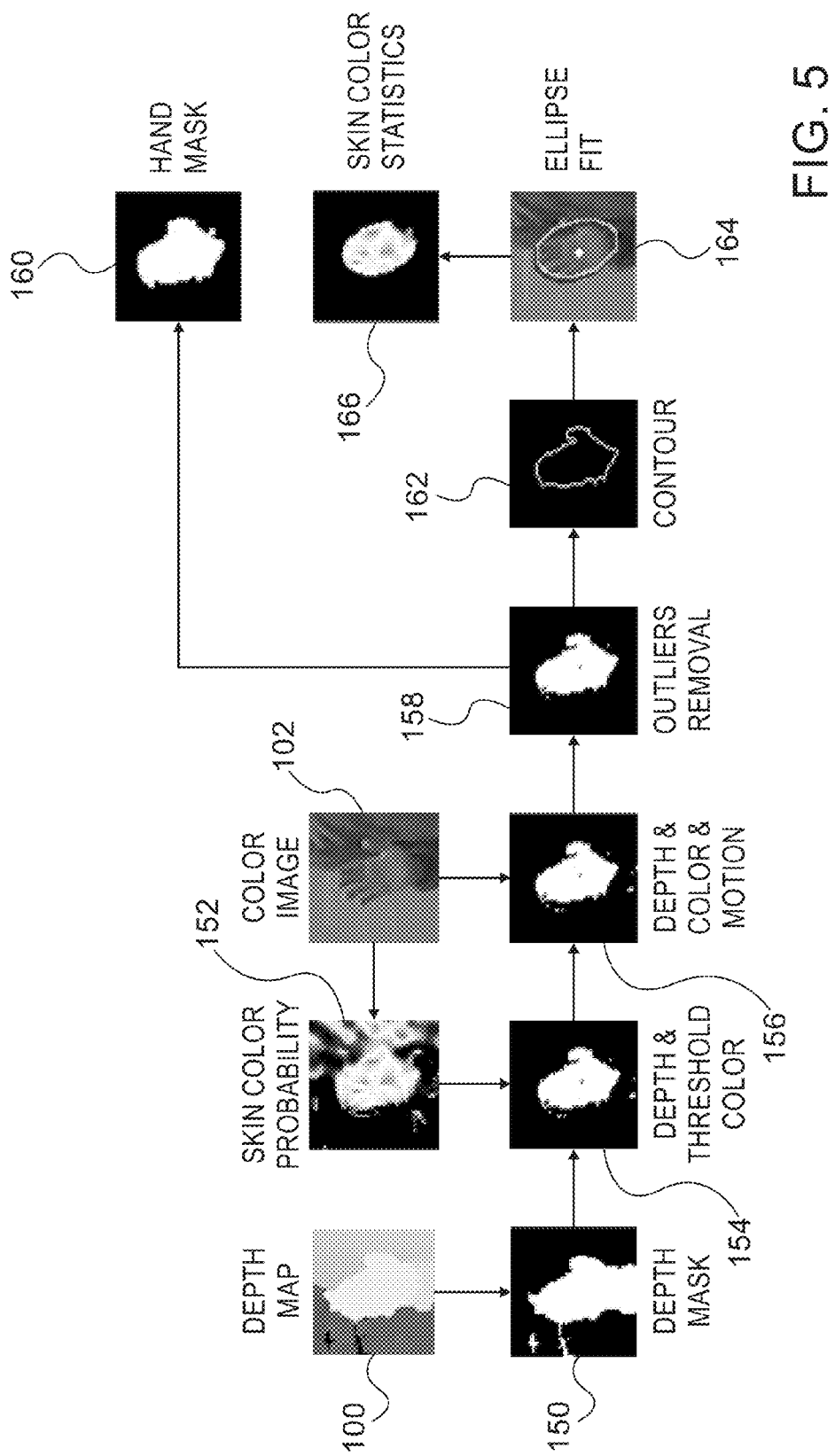
FIG. 5 is a flow chart that schematically shows a sequence of images produced by a method for hand detection and tracking, in accordance with an embodiment of the present invention.

FIG. 5 is a flow chart that schematically shows a sequence of images produced at successive steps in the method described above for color-dominant hand tracking, in accordance with an embodiment of the present invention. Tracking engine 134 extracts a depth mask 150 from depth image 100 and a skin color probability map 152 from color image 102. Map 152 is thresholded to create the color mask, which is logically combined with depth mask 150 to create a depth and color mask 154. The tracking engine updates the color motion mask based on color image 102, and logically combines this mask with mask 154 to create a fusion mask 156 based on all three factors (depth, color and motion).

To avoid tracking artifacts, the tracking engine may remove outliers from mask 156, giving a rectified fusion mask 158. Mask 158 is then dilated to give a hand mask 160 to be used in processing the next depth and color image frames.

To find the orientation of the hand, tracking engine 134 extracts a contour 162 from mask 158 and then fits an ellipse 164 (or other parametric model) to the contour. The axes of the ellipse give the hand orientation. The tracking engine updates the skin color statistics of the hand based on a color distribution 166 of the pixels within ellipse 164.

Depth-Dominant Hand Location Tracking with Fusion of Color Information

In the depth-dominant mode, tracking engine 134 may track the hand location by combining the following methods:

1. The tracking engine may generate a morphological depth-based map by comparing the depth of each candidate hand pixel with the depth of pixels located at some distance from it, as described above.
2. Background-foreground segmentation may be performed using motion, based on depth data: The moving foreground is used to filter possible hand-candidate locations from the stationary background.
3. Tracking to nearest blob—The tracking engine may create a map that combines the morphological, moving foreground and color information described above, and may then search this map for the hand location. The search may use a mean-shift algorithm. Such algorithms are described, for example, in the above-mentioned article by Bradski, as well as by Comaniciu et al., in "Kernel-Based Object Tracking," *IEEE Transactions on Pattern Analysis and Machine Intelligence* 25:5 (2003), pages 564-577, which is incorporated herein by reference. The search starts from the location of the hand in the previous frame and detects the nearest blob whose size resembles the expected hand size. The center of mass of this blob is the approximate hand location.

Tracking engine 134 may enhance the depth-based tracking results with color information, for example, by combining the depth-based morphological map and/or the depth-based motion (foreground) mask, with a skin-like color map of the type described above. If the morphological and skin color information is represented by probability maps, the probability values can be multiplied together, and the result may then be filtered using the motion mask. Dark and very bright image areas, in which the color information may be unreliable, may be assigned a minimal probability value in the color map, as explained above. The color histograms that are used by the skin-like color filter are taken from hand pixels (detected based on depth information) and are updated only when sufficient color information is available.

In addition to color information, tracking engine 134 may extract edge information from the color images if the lighting conditions are appropriate and the hand is relatively static. Color-based edge information is often more accurate than depth-based edge information, because commercially-available color image sensors (even low-cost devices) generally have higher resolution than depth sensors. The color-based edge information can therefore be used for fine-tuning the hand location during depth-based tracking, following a similar procedure to that shown in FIG. 5.

The use of color in refining depth-dominant hand tracking provides a number of benefits: Often the color information allows separating the hand from the forearm (for example, when the user is wearing a long-sleeved shirt of different color from the skin), whereas depth information generally does not. The color information is also useful in segmenting the hand from another part of the body or a nearby object on which the hand is resting. Furthermore, color edges tend to be more stable from frame to frame than depth edges, and the color edge information may thus facilitate more accurate localization of the hand.

Another option for fusing depth- and color-based information is to use a location and motion filter, such as a linear motion filter or a Kalman filter. Such filters typically combine an estimate of the location of the tracked object extracted from the current frame with motion information extracted by comparing previous frames with the current one. In one embodiment, the location estimate can be extracted from a depth-based object tracker as described above, while the motion estimate is extracted using optical flow between the previous color (or gray-scale) image and the current color image.

Although the embodiments described above relate to particular combinations of color images with depth images, the principles of the present invention may similarly be applied to other synchronized combinations of two or more image types. For example, 2D infrared image information provided by the image sensor used in depth imaging subassembly 44 may be used to supplement the color and depth information. As another example, 2D gray-scale images may be processed for purposes of detecting motion, morphology, edges and quality.

Furthermore, the methods described above may be adapted and extended to track not only the hands, but also the fingers and other parts of the body, as well as extracting the posture of the body as a whole. These methods may similarly be applied in tracking other parts of the body.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for image processing, comprising:
   receiving a depth image of a scene containing a human subject;
   receiving a color image of the scene containing the human subject;
   identifying a part of a body of the subject in at least one of the images;
   evaluating a quality of both the depth image and the color image, and selecting, responsively to the quality, one of the images to be dominant in processing of the part of the body in the images; and
   localizing the identified part in the dominant one of the images, while using supporting data from the other one of the images.

2. The method according to claim 1, wherein receiving the depth image comprises projecting patterned optical radiation toward the subject, and capturing and processing a two-dimensional image of the patterned optical radiation that is reflected from the subject.

3. The method according to claim 2, wherein projecting the patterned optical radiation comprises projecting a spatial pattern of the optical radiation, and wherein processing the two-dimensional image comprises deriving depth coordinates of the body of the subject based on transverse shifts of the spatial pattern in the two-dimensional image.

4. The method according to claim 2, wherein projecting the patterned optical radiation comprises projecting infrared radiation.

5. The method according to claim 1, wherein the part of the body comprises a hand of the human subject.

6. The method according to claim 5, wherein localizing the identified part comprises identifying a group of pixels belonging to the hand, fitting a parametric model to the group, and finding an orientation of the hand based on a parameter of the model.

7. The method according to claim 6, wherein fitting the parametric model comprises fitting an ellipse to the group, and wherein finding the orientation comprises finding a direction of an axis of the ellipse.

8. The method according to claim 5, wherein localizing the identified part comprises detecting an initial location of the hand by recognizing, in a sequence of the images, a predetermined focal gesture made by the hand, and then tracking the hand beginning from the initial location.

9. The method according to claim 1, wherein localizing the identified part comprises deriving from the depth image and color image respective matrix data structures, having dimensions corresponding to the dimensions of the depth image and color image, and combining at least a part of the respective matrix data structures in order to find a location of the part of the body.

10. The method according to claim 9, wherein deriving the respective matrix data structures comprises deriving respective masks indicating pixels that are candidates to belong to the part of the body, and wherein combining the respective matrix data structures comprises applying a logical operation to the respective masks.

11. The method according to claim 9, wherein at least one of the matrix data structures is indicative of the pixels in at least one of the images in which significant changes occurred over a sequence of the images, thereby representing motion in the images.

12. The method according to claim 9, wherein at least one of the matrix data structures is indicative of morphological features of the part of the body.

13. The method according to claim 9, wherein deriving the respective matrix data structures comprises deriving from the depth image and color image respective maps containing graded values expressing an ascending monotonic function associated with a property of interest at pixels in the images, and wherein combining the respective matrix data structures comprises applying a mathematical operation to the respective maps.

14. The method according to claim 13, wherein the graded values indicate respective probabilities that the pixels to belong to the part of the body, and wherein applying the mathematical operation comprises multiplying the respective maps together in order to find the location of the part of the body.

15. The method according to claim 1, wherein when the color image is selected to be the dominant one, localizing the identified part comprises identifying a range of depths in which the part of the body is located, and filtering the color image using depth coordinates from the depth image to eliminate pixels that are outside the range.

16. The method according to claim 1, wherein when the depth image is selected to be the dominant one, localizing and tracking the identified part comprises identifying a range of colors associated with the part of the body, and filtering the depth image using color information from the color image to eliminate pixels having colors that are outside the range.

17. The method according to claim 1, wherein localizing the identified part comprises applying a location and motion filter to a sequence of the depth and color images in order to combine depth- and color-based information from the images.

18. The method according to claim 1, wherein localizing the identified part comprises tracking the identified part over a sequence of the images.

19. The method according to claim 18, wherein tracking the identified part comprises processing at least some of the images in the sequence using both the supporting data and information from one or more previous images in the sequence.

20. Apparatus for image processing, comprising:
an input interface coupled to receive a depth image of a scene containing a human subject and to receive a color image of the scene containing the human subject; and
a processor, which is configured to identify a part of a body of the subject in at least one of the images, to evaluate a quality of both the depth image and the color image, and to select, responsively to the quality, one of the images to be dominant in processing of the part of the body in the images, and to localize the identified part in the dominant one of the images, while using supporting data from the other one of the images.

21. The apparatus according to claim 20, and comprising a imaging assembly, which is configured to project patterned optical radiation toward the subject, and to capture and process a two-dimensional image of the patterned optical radiation that is reflected from the subject in order to generate the depth image.

22. The apparatus according to claim 21, wherein the patterned optical radiation comprises a spatial pattern, and wherein the processor is configured to derive depth coordinates of the body of the subject based on transverse shifts of the spatial pattern in the two-dimensional image.

23. The apparatus according to claim 21, wherein the patterned optical radiation comprises infrared radiation.

24. The apparatus according to claim 20, wherein the part of the body comprises a hand of the human subject.

25. The apparatus according to claim 24, wherein the processor is configured to identify a group of pixels belonging to the hand, to fit a parametric model to the group, and to find an orientation of the hand based on a parameter of the model.

26. The apparatus according to claim 25, wherein the parametric model comprises an ellipse that is fitted to the group of the pixels, and wherein the orientation of the hand is indicated by a direction of an axis of the ellipse.

27. The apparatus according to claim 24, wherein the processor is configured to detect an initial location of the hand by recognizing, in a sequence of the images, a predetermined focal gesture made by the hand, and then to track the hand beginning from the initial location.

28. The apparatus according to claim 20, wherein the processor is configured to derive from the depth image and color image respective matrix data structures, having dimensions corresponding to the dimensions of the depth image and color image, and to combine at least a part of the respective matrix data structures in order to find a location of the part of the body.

29. The apparatus according to claim 28, wherein the respective matrix data structures comprise respective masks indicating pixels that are candidates to belong to the part of the body, and wherein the processor is configured to combine the respective masks using a logical operation.

30. The apparatus according to claim 28, wherein at least one of the matrix data structures is indicative of the pixels in at least one of the images in which significant changes occurred over a sequence of the images, thereby representing motion in the images.

31. The apparatus according to claim 28, wherein at least one of the matrix data structures is indicative of morphological features of the part of the body.

32. The apparatus according to claim 28, wherein the respective matrix data structures comprise respective maps containing graded values expressing an ascending monotonic function associated with a property of interest at pixels in the images, and wherein the processor is configured to combine the respective maps using a mathematical operation.

33. The apparatus according to claim 32, wherein the graded values indicate, for pixels in the images, respective probabilities that the pixels to belong to the part of the body, and wherein the processor is configured to multiply the respective masks together in order to find the location of the part of the body.

34. The apparatus according to claim 20, wherein the processor is configured, upon selecting the color image to be the dominant one, to identify a range of depths in which the part of the body is located, and to filter the color image using depth coordinates from the depth image to eliminate pixels that are outside the range.

35. The apparatus according to claim 20, wherein the processor is configured, upon selecting the depth image to be the dominant one, to identify a range of colors associated with the part of the body, and to filter the depth image using color information from the color image to eliminate pixels having colors that are outside the range.

36. The apparatus according to claim 20, wherein the processor is configured to apply a location and motion filter to a sequence of the depth and color images in order to combine depth- and color-based information from the images.

37. The apparatus according to claim 20, wherein the processor is configured to track the identified part over a sequence of the images.

38. The apparatus according to claim 37, wherein the processor is configured to track the identified part by processing at least some of the images in the sequence using both the supporting data and information from one or more previous images in the sequence.

39. A computer software product, comprising a non-transitory computer-readable medium in which program instructions are stored, which instructions, when read by a computer, cause the computer to receive a depth image of a scene containing a human subject and to receive a color image of the scene containing the human subject, to identify a part of a body of the subject in at least one of the images, to evaluate a quality of both the depth image and the color image, and to select, responsively to the quality, one of the images to be dominant in processing of the part of the body in the images, and to localize the identified part in the dominant one of the images, while using supporting data from the other one of the images.

40. The product according to claim 39, wherein the depth image is generated by projecting patterned optical radiation toward the subject, and capturing and processing a two-dimensional image of the patterned optical radiation that is reflected from the subject.

41. The product according to claim 40, wherein the patterned optical radiation comprises a spatial pattern, and wherein the instructions cause the computer to derive depth coordinates of the body of the subject based on transverse shifts of the spatial pattern in the two-dimensional image.

42. The product according to claim 40, wherein the patterned optical radiation comprises infrared radiation.

43. The product according to claim 39, wherein the part of the body comprises a hand of the human subject.

44. The product according to claim 43, wherein the instructions cause the computer to identify a group of pixels belonging to the hand, to fit a parametric model to the group, and to find an orientation of the hand based on a parameter of the model.

45. The product according to claim 44, wherein the parametric model comprises an ellipse that is fitted to the group of the pixels, and wherein the orientation of the hand is indicated by a direction of an axis of the ellipse.

46. The product according to claim 43, wherein the instructions cause the computer to detect an initial location of the hand by recognizing, in a sequence of the images, a predetermined focal gesture made by the hand, and then to track the hand beginning from the initial location.

47. The product according to claim 39, wherein the instructions cause the computer to derive from the depth image and color image respective matrix data structures, having dimensions corresponding to the dimensions of the depth image and color image, and to combine at least a part of the respective matrix data structures in order to find a location of the part of the body.

48. The product according to claim 47, wherein the respective matrix data structures comprise respective masks indicating pixels that are candidates to belong to the part of the body, and wherein the instructions cause the computer to combine the respective masks using a logical operation.

49. The product according to claim 47, wherein at least one of the matrix data structures is indicative of the pixels in at least one of the images in which significant changes occurred over a sequence of the images, thereby representing motion in the images.

50. The product according to claim 47, wherein at least one of the matrix data structures is indicative of morphological features of the part of the body.

51. The product according to claim 47, wherein the respective matrix data structures comprise respective maps containing graded values expressing an ascending monotonic function associated with a property of interest at pixels in the images, and wherein the instructions cause the computer to combine the respective maps using a mathematical operation.

52. The product according to claim 51, wherein the graded values indicate, for pixels in the images, respective probabilities that the pixels to belong to the part of the body, and wherein the instructions cause the computer to multiply the respective masks together in order to find the location of the part of the body.

53. The product according to claim 39, wherein the instructions cause the computer, upon selecting the color image to be the dominant one, to identify a range of depths in which the part of the body is located, and to filter the color image using depth coordinates from the depth image to eliminate pixels that are outside the range.

54. The product according to claim 39, wherein the instructions cause the computer, upon selecting the depth image to be the dominant one, to identify a range of colors associated with the part of the body, and to filter the depth image using color information from the color image to eliminate pixels having colors that are outside the range.

55. The product according to claim 39, wherein the instructions cause the computer to apply a location and motion filter to a sequence of the depth and color images in order to combine depth- and color-based information from the images.

56. The product according to claim 39, wherein the instructions cause the computer to track the identified part over a sequence of the images.

57. The product according to claim 56, wherein the instructions cause the computer to track the identified part by processing at least some of the images in the sequence using both the supporting data and information from one or more previous images in the sequence.

58. A method for image processing, comprising:
  receiving a depth image of a scene containing a human subject;
  receiving a color image of the scene containing the human subject;
  identifying a part of a body of the subject in at least one of the images;
  evaluating a quality of both the depth image and the color image, and selecting, responsively to the quality, one of the images to be dominant in processing of the part of the body in the images; and
  segmenting the identified part in the dominant one of the images, while using supporting data from the other one of the images.

* * * * *